(12) United States Patent
Ibrahim et al.

(10) Patent No.: US 12,512,890 B2
(45) Date of Patent: Dec. 30, 2025

(54) BEAM DOMAIN PREPROCESSOR INPUT TYPE SELECTION AND PARAMETER DETERMINATION

(71) Applicant: InterDigital Patent Holdings, Inc., Wilmington, DE (US)

(72) Inventors: Mohamed Salah Ibrahim, Chesterbrook, PA (US); Akshay Malhotra, San Jose, CA (US); Mihaela Beluri, Jericho, NY (US); Yugeswar Deenoo Narayanan Thangaraj, Chalfont, PA (US); Moon-il Lee, Melville, NY (US); Mohamed Amine Arfaoui, Montreal (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/428,110

(22) Filed: Jan. 31, 2024

(65) Prior Publication Data

US 2024/0275453 A1 Aug. 15, 2024

Related U.S. Application Data

(60) Provisional application No. 63/442,214, filed on Jan. 31, 2023.

(51) Int. Cl.
*H04B 7/06* (2006.01)
*H04B 7/0456* (2017.01)

(52) U.S. Cl.
CPC ......... *H04B 7/0626* (2013.01); *H04B 7/0486* (2013.01)

(58) Field of Classification Search
CPC ........................... H04B 7/0626; H04B 7/0486
See application file for complete search history.

(56) References Cited

U.S. PATENT DOCUMENTS

2017/0244533 A1* 8/2017 Onggosanusi ....... H04B 7/0478
2021/0351885 A1 11/2021 Chavva et al.
(Continued)

FOREIGN PATENT DOCUMENTS

CN 115280688 A 11/2022
EP 4543074 A1 4/2025

OTHER PUBLICATIONS

TS 38.211 V17.3.0, "3rd Generation Partnership Project (3GPP)", Technical Specification Group Radio Access Network, NR, Physical channels and modulation (Release 17), Sep. 2022, 136 pages.
(Continued)

*Primary Examiner* — Jaison Joseph
(74) *Attorney, Agent, or Firm* — Condo Roccia Koptiw LLP

(57) ABSTRACT

Systems, methods, and instrumentalities are disclosed herein for beam domain preprocessor input type selection and parameter determination. A device may determine a beam domain preprocessing input type based on at least one of: a rank threshold, a performance metric, or a channel condition. The device may preprocess channel state information (CSI) based on the beam domain preprocessing input type. The device may compress the preprocessed CSI. The device may send the compressed preprocessed CSI (e.g., and an indication of the beam domain preprocessing input type).

16 Claims, 10 Drawing Sheets

(56) References Cited

U.S. PATENT DOCUMENTS

2022/0149904 A1* 5/2022 Timo .................. H04L 25/4927
2022/0407745 A1 12/2022 Lo et al.
2024/0275453 A1* 8/2024 Ibrahim ............... H04B 7/0617
2024/0283509 A1* 8/2024 Timo ..................... G06N 3/096

OTHER PUBLICATIONS

TS 38.212 V17.3.0, "3rd Generation Partnership Project (3GPP)", Technical Specification Group Radio Access Network, NR, Multiplexing and channel coding (Release 17), Sep. 2022, pp. 1-201.
TS 38.213 V17.3.0, "3rd Generation Partnership Project (3GPP)", Technical Specification Group Radio Access Network, NR, Physical layer procedures for control (Release 17), Sep. 2022, pp. 1-260.
TS 38.214 V17.3.0, "3rd Generation Partnership Project (3GPP)", Technical Specification Group Radio Access Network, NR, Physical Layer Procedures for Data (Release 17), Sep. 2022, pp. 1-232.
TS 38.321 V17.2.0, "3rd Generation Partnership Project (3GPP)", Technical Specification Group Radio Access Network, NR, Medium Access Control (MAC) protocol specification (Release 17), Sep. 2022, pp. 1-246.
TS 38.331 V17.2.0, "3rd Generation Partnership Project (3GPP)", Technical Specification Group Radio Access Network, NR, Radio Resource Control (RRC) protocol specification (Release 17), Sep. 2022, pp. 1-1298.

* cited by examiner

BEAM DOMAIN PREPROCESSOR INPUT TYPE SELECTION AND PARAMETER DETERMINATION

CROSS-REFERENCE TO RELATED APPLICATIONS

This application claims the benefit of U.S. Provisional Patent Application No. 63/442,214, filed Jan. 31, 2023, the contents of which are hereby incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, devices, and instrumentalities are described herein related to joint selection of a beam domain preprocessor and artificial intelligence/machine learning (AI/ML) model.

A device (e.g., a wireless transmit/receive unit (WTRU)) may determine a beam domain preprocessing input type based on at least one of: a rank threshold, a performance metric, or a channel condition. The device may preprocess channel state information (CSI) based on the beam domain preprocessing input type to generate beam domain CSI. The device may compress the beam domain CSI.

The device may send (e.g., to a network entity, for example, a base station) the compressed beam domain CSI (e.g., and an indication of the beam domain preprocessing input type).

The beam domain preprocessing input type may be full channel matrix or eigenvector. The device may determine the beam domain preprocessing input type based on the rank threshold and the channel condition. The device may determine a measured rank based on the channel condition. On a condition that the measured rank is less than or equal to the rank threshold, the device may select eigenvector as the beam domain preprocessing input type. The device may, on a condition that the measured rank is greater than the rank threshold, select full channel matrix as the beam domain preprocessing input type.

The device may determine the beam domain preprocessing input type based on the performance metric and the channel condition. The device may determine a performance of a first beam domain preprocessing input type based on the performance metric and the channel condition. The device may determine a performance of a second beam domain preprocessing input type based on the performance metric and the channel condition. The device may compare the performance of the first beam domain preprocessing input type to the performance of the second beam domain preprocessing input type. The device may select the beam domain preprocessing input type based on the comparison.

The performance metric may be a normalized mean squared error or a squared generalized cosine similarity. The device may determine a beam domain preprocessing parameter associated with the determined beam domain preprocessing input type. Preprocessing the CSI may be further based on the beam domain preprocessing parameter.

The beam domain preprocessing parameter may be one or more of: a parameter related to a transformation matrix used for beam domain preprocessing; a discrete Fourier transform basis of a beam codebook; an oversampling factor of the beam codebook; a maximum number of transmit beams; a maximum number of receive beams; an index of a selected transmit beam; an index of a selected receive beam; polarization information; or an input type for beam domain preprocessing.

The device may receive, from a network entity, an input type selection indication that indicates for the device to determine the beam domain preprocessing input type. The device may send, to the network entity, an indication of the determined beam domain preprocessing input type.

DETAILED DESCRIPTION

Figure 1A:
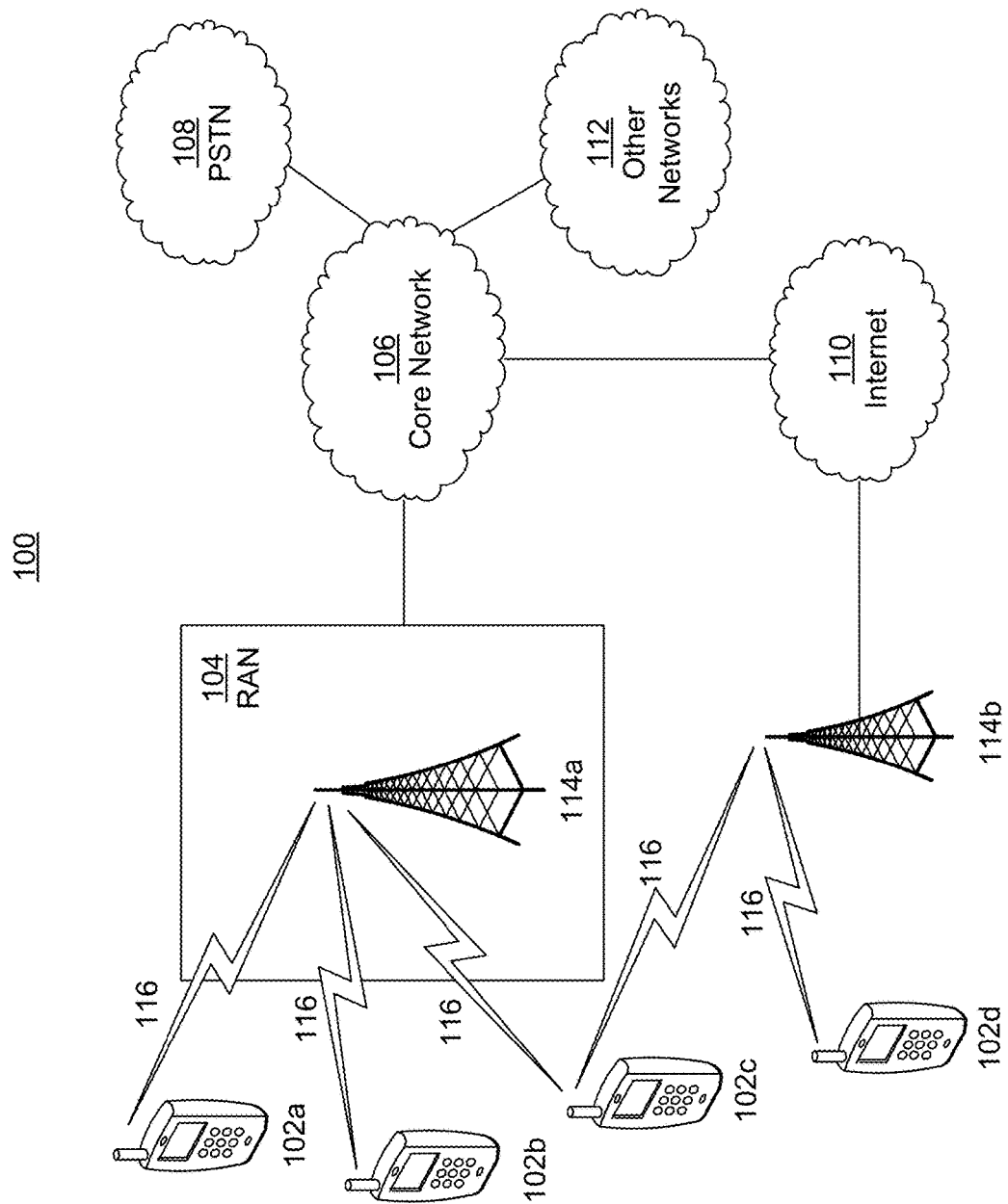
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
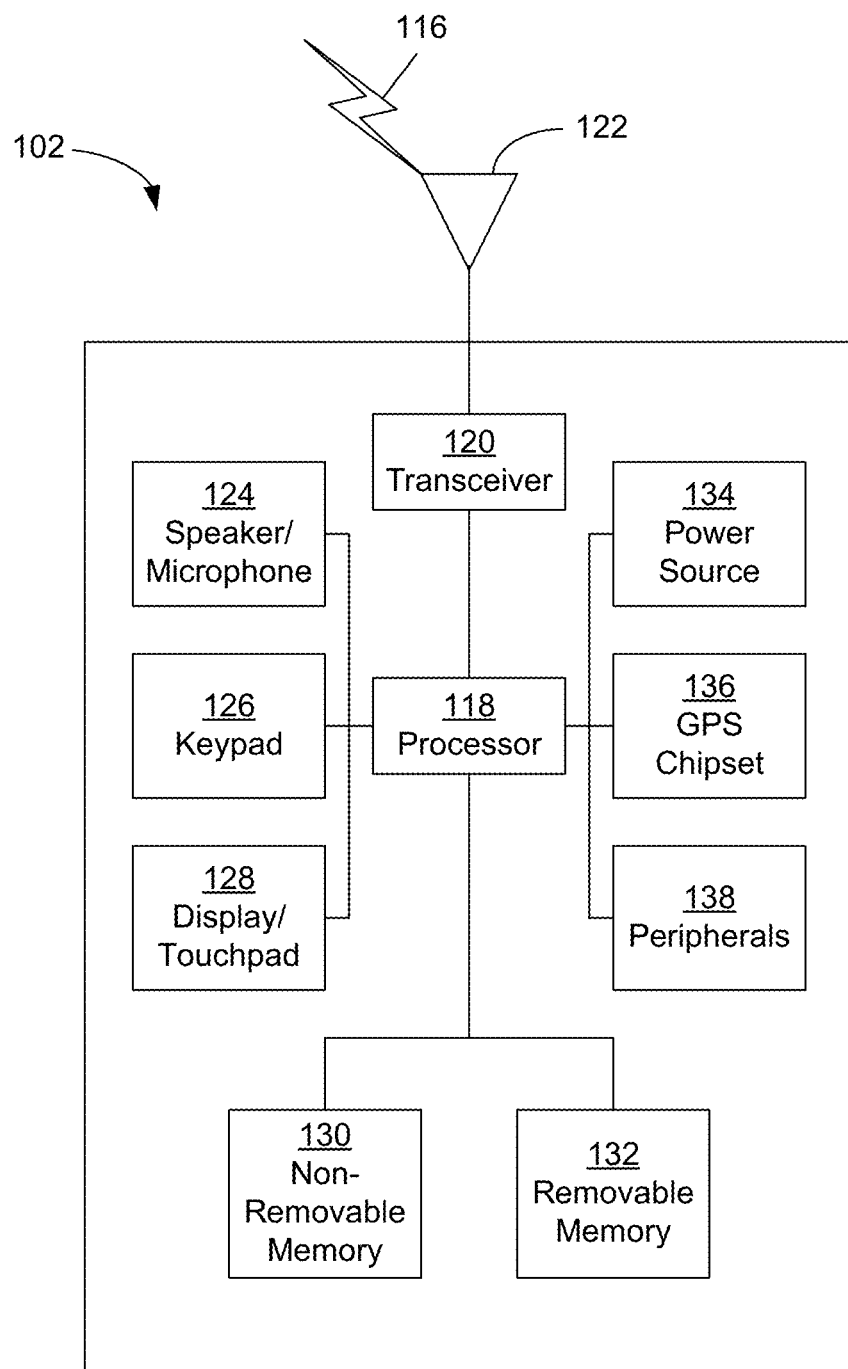
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
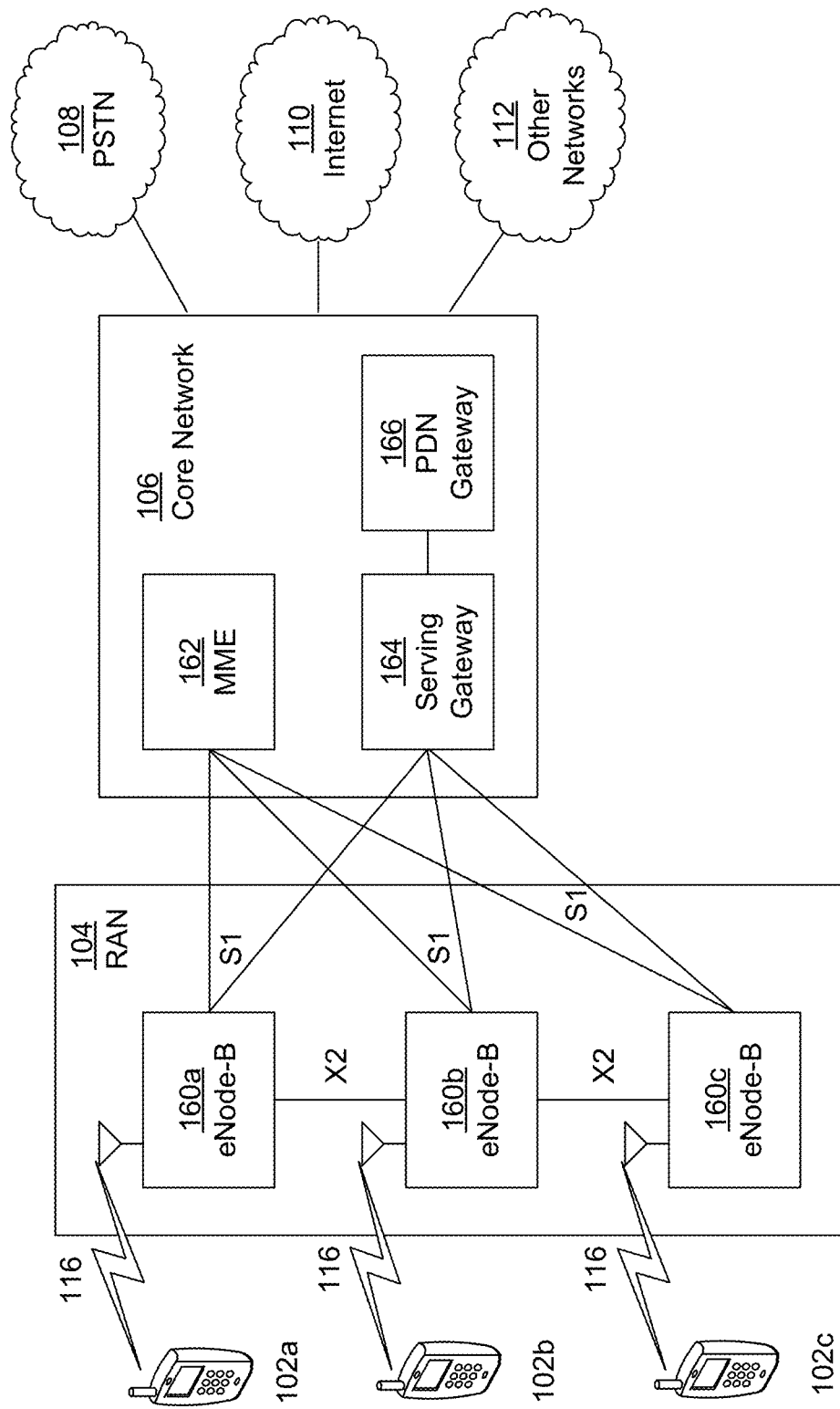
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
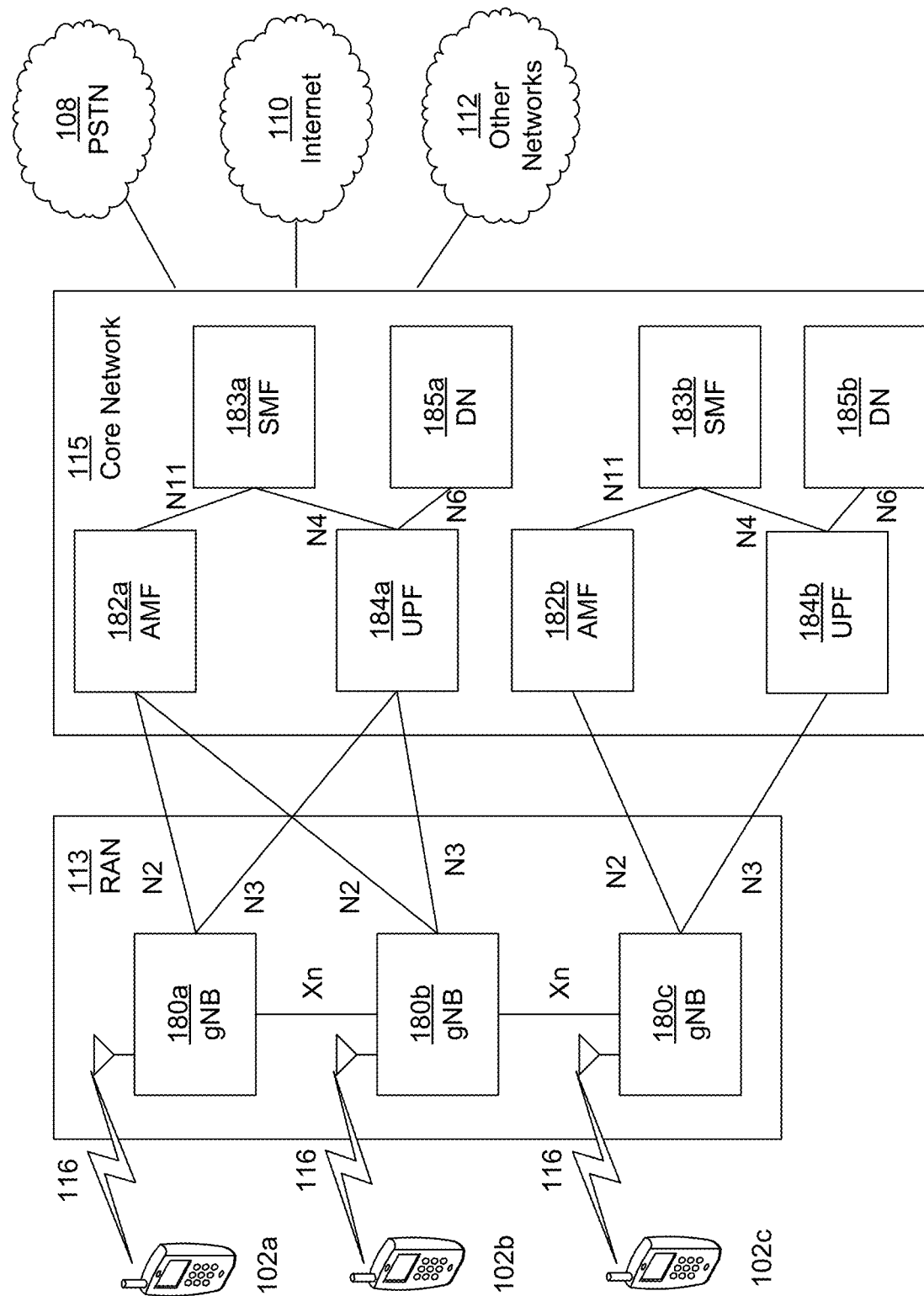
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For artificial intelligence/machine learning (AI/ML) based channel state information (CSI) feedback, feature(s) described herein may reduce the CSI processing complexity and CSI reporting overhead by leveraging beam domain preprocessing and an AI/ML model to generate the CSI feedback.

Feature(s) associated with CSI reporting are provided herein. CSI may include one or more of the following: a channel quality index (CQI); a rank indicator (RI); a precoding matrix index (PMI); a Layer1 (L1) channel measurement (e.g., reference signal received power (RSRP) such as L1-RSRP or signal to interference and noise ratio (SINR)); a CSI-RS resource indicator (CRI); a synchronization signal/physical broadcast channel (SS/PBCH) block resource indicator (SSBRI); a layer indicator (LI); or any other measurement quantity measured by a WTRU from the configured reference signals (e.g., CSI-RS, SS/PBCH block, or any other reference signal).

Example CSI reporting framework(s) are provided herein. A WTRU may be configured to report CSI, for example, via an uplink control channel (e.g., a physical uplink control channel (PUCCH)) or per the gNBs' request on an uplink shared channel (e.g., a physical uplink shared channel (PUSCH)) grant. Based on the configuration, CSI-RS may cover the full bandwidth of a bandwidth part (BWP) or may cover a fraction of a BWP. Within the CSI-RS bandwidth, the CSI-RS may be configured for each physical resource block (PRB) or for every other PRBs (e.g., alternative PRBs). In the time domain, CSI-RS resources may be (e.g., may be configured to be) periodic, semi-persistent, or aperiodic. Semi-persistent CSI-RS may be similar to periodic CSI-RS, except that the resource may be deactivated or activated by MAC CEs and the WTRU may report related measurements when (e.g., only when) the resource is activated. For aperiodic CSI-RS, the WTRU may be triggered to report measured CSI-RS on PUSCH by a request via downlink control information (DCI). Periodic reports may be carried via PUCCH. Semi-persistent reports may be carried via PUCCH or PUSCH. The reported CSI may be used by the scheduler to allocate optimal resource blocks (e.g., based on the channel's time-frequency selectivity), determine precoding matrices, beams, transmission mode, etc., and select suitable modulation and coding schemes (MCSs). The reliability, accuracy, and/or timeliness of WTRU CSI reports may be involved in meeting ultra-reliable and low latency communications (URLLC) service requirements.

A WTRU may be configured with a CSI measurement setting. The CSI measurement setting may include one or more CSI reporting settings, resource settings, and/or a link between one or more CSI reporting settings and one or more resource settings.

Figure 2:
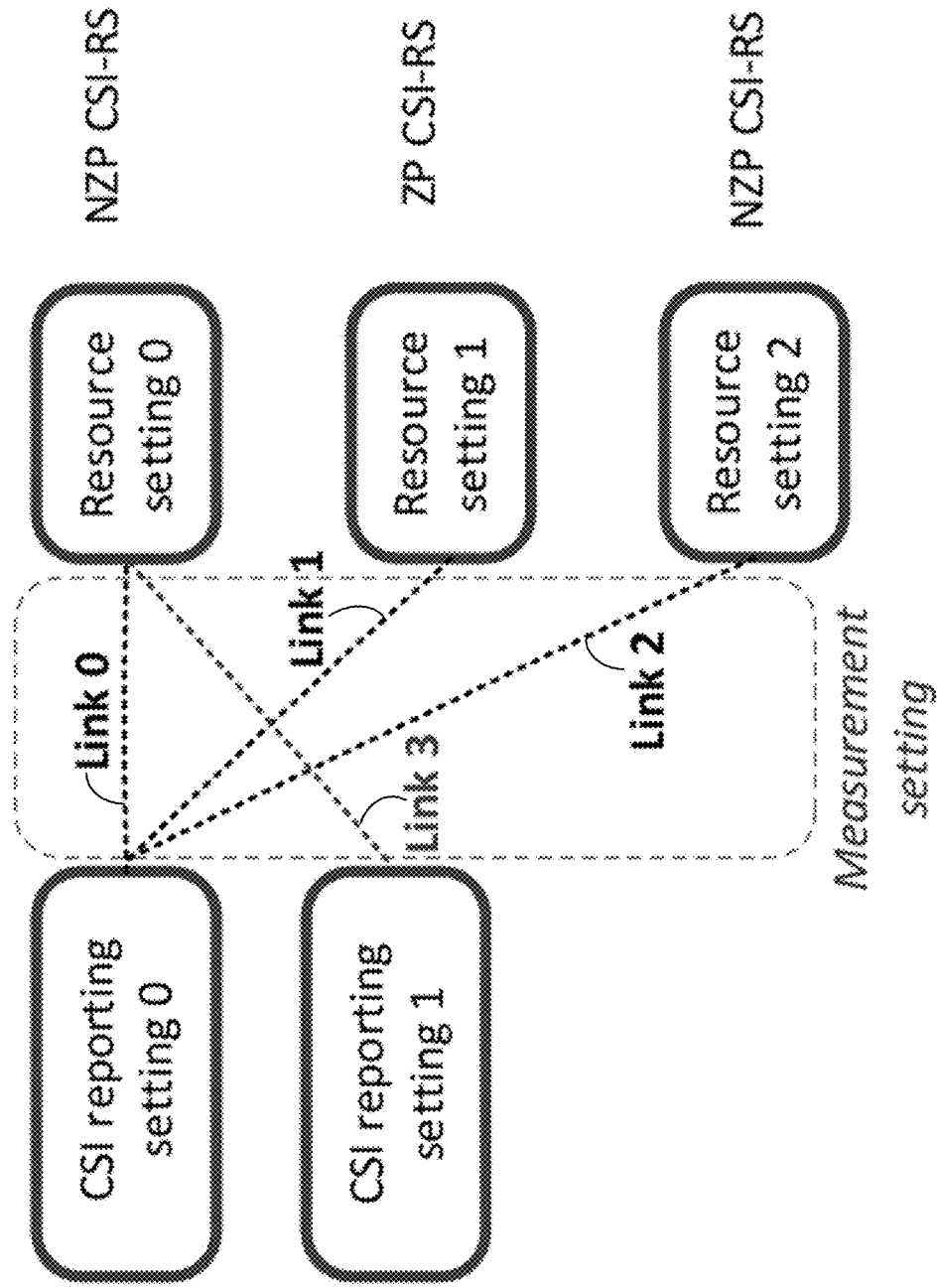
FIG. 2 illustrates an example of a CSI measurement setting.

FIG. 2 shows an example of a CSI measurement setting. FIG. 2 shows an example configuration for CSI reporting settings, resource settings, and link.

For a CSI measurement setting, one or more of the following configuration parameters may be provided. The configuration parameters may include N≥1 CSI reporting settings, M≥1 resource settings, and a CSI measurement setting that links the N CSI reporting settings with the M resource settings. The configuration parameters may include a CSI reporting setting. The CSI reporting setting may include one or more of the following: time-domain behavior (e.g., aperiodic or periodic/semi-persistent); frequency-granularity (e.g., at least for PMI and CQI); CSI reporting type (e.g., PMI, CQI, RI, CRI, etc.); or if a PMI is reported, PMI Type (e.g., Type I or II) and codebook configuration. The configuration parameters may include a resource setting. The resource setting may include one or more of the following: a time-domain behavior (e.g., aperiodic or periodic/semi-persistent); an RS type (e.g., for channel measurement or interference measurement); and/or S≥1 resource set(s) (e.g., where each resource set may include Ks resources). The configuration parameters may include a CSI measurement setting. The CSI measurement setting may include one or more of the following: a CSI reporting setting; a resource setting; or, for CQI, a reference transmission scheme setting. The configuration parameters may include the following. For CSI reporting for a component carrier, one or more of the following frequency granularities may be supported: wideband CSI, partial band CSI, or sub-band CSI.

Feature(s) associated with codebook-based precoding are provided herein.

Figure 3:
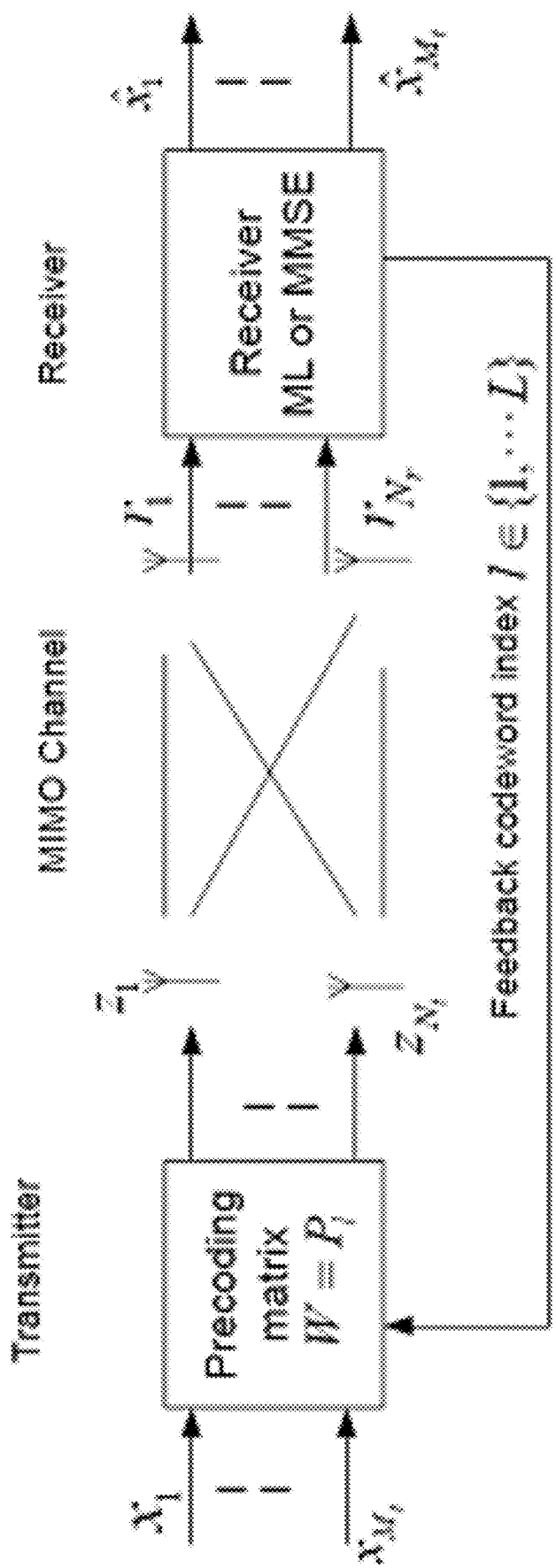
FIG. 3 illustrates an example of codebook-based precoding with feedback information.

FIG. 3 shows an example of codebook-based precoding with feedback information. The feedback information may include a PMI. The PMI may be referred to as a codeword index in the codebook (e.g., as shown with respect to FIG. 3).

A codebook may include a set of precoding vectors/matrices for one or more ranks (e.g., each rank) and the number of antenna ports (e.g., as illustrated in FIG. 3). One or more precoding vectors/matrices (e.g., each of the precoding vectors/matrices) may have its own index, for example, so that a receiver may inform preferred precoding vector/matrix index to a transmitter. The codebook-based precoding may have performance degradation due to its finite number of precoding vector/matrix (e.g., as compared with non-codebook-based precoding). Codebook-based precoding may be associated with lower control signaling/feedback overhead. Table 1 shows an example of codebook for 2Tx.

TABLE 1

2Tx downlink codebook

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Feature(s) associated with CSI processing criteria are provided herein. A CSI processing unit (CPU) may be referred to as a minimum CSI processing unit. A WTRU may support one or more CPUs (e.g., N CPUs). A WTRU with N CPUs may estimate N CSI feedbacks calculation in parallel. N may be associated with WTRU capability. In examples, if a WTRU receives a request to estimate more than N CSI feedbacks at the same time, the WTRU may perform (e.g., only perform) high priority N CSI feedbacks (e.g., and the rest may not be estimated).

The start and end of a CPU may be determined based on the CSI report type (e.g., aperiodic, periodic, or semi-persistent). For example, for an aperiodic CSI report, a CPU may be occupied from the first orthogonal frequency-division multiplexing (OFDM) symbol after the PDCCH trigger until the last OFDM symbol of the PUSCH carrying the CSI report. For a periodic and semi-persistent CSI report, a CPU may be occupied from the first OFDM symbol of one or more associated measurement resources (e.g., not earlier than CSI reference resource) until the last OFDM symbol of the CSI report.

The number of CPUs occupied may be different based on the CSI measurement types (e.g., beam-based or non-beam based). For example, for non-beam related reports, Ks CPUs may be used if Ks CSI-RS resources are in the CSI-RS resource set for channel measurement. For beam-related reports (e.g., "cri-RSRP," "ssb-Index-RSRP," or "none"), a (e.g., one) CPU may be used (e.g., irrespective of the number of CSI-RS resource in the CSI-RS resource set for channel measurement, for example, due to the CSI computation complexity being low). "None" may be used for P3 (e.g., downlink beam refinement procedure) operation or aperiodic tracking reference signal (TRS) transmission. For an aperiodic CSI reporting with a single CSI-RS resource, a (e.g., one) CPU may be occupied. For a CSI reporting Ks CSI-RS resources, Ks CPUs may be occupied (e.g., as the WTRU may perform CSI measurement for each CSI-RS resource).

If the number of unoccupied CPUs (e.g., Nu) is less than a threshold number of (e.g., a required number of) CPUs (e.g., $N_r$) for CSI reporting, one or more of the following WTRU behaviors may be used: the WTRU may drop $N_r-N_u$ CSI reporting(s) (e.g., based on priorities in the case of UCI on PUSCH without data/HARQ); or (e.g., in other cases) the WTRU may report dummy information in $N_r-N_u$ CSI reporting(s) based on priorities to avoid rate-matching handling of PUSCH.

Artificial intelligence (AI) may refer to the behavior exhibited by machines. Such behavior may mimic cognitive functions to sense, reason, adapt, and/or act. Machine learning (ML) may refer to the type of algorithms that solve a problem based on learning through experience (e.g., data) without explicitly being programmed to do so (e.g., by a configured set of rules). ML may be considered a subset of AI.

Different machine learning paradigms may be envisioned based on the nature of data or feedback available to the learning algorithm. For example, a supervised learning approach may involve learning a function that maps an input to an output based on a labeled training example (e.g., wherein each training example may include an input and the corresponding output). For example, an unsupervised learning approaches may involve detecting patterns in the data with no pre-existing labels. For example, a reinforcement learning approach may involve performing a sequence of actions in an environment to increase (e.g., maximize) the cumulative reward. ML algorithms may be applied using a combination or interpolation of the above-mentioned learning approaches. For example, a semi-supervised learning approach may use a combination of a small amount of labeled data with a large amount of unlabeled data during training. In this regard, semi-supervised learning falls between unsupervised learning (e.g., with no labeled training data) and supervised learning (e.g., with only labeled training data).

Auto-encoders (AEs) are a class of deep neural networks (DNNs) that arise in the context of unsupervised machine learning setting (e.g., wherein the high-dimensional data is non-linearly transformed to a lower dimensional latent vector using a DNN-based encoder and the lower dimensional latent vector is used to reproduce the high-dimensional data using a non-linear decoder). The encoder may be represented as $E(x; W_e)$, where x is the high-dimensional data and $W_e$ represents the parameters of the encoder. The decoder may be represented as $D(z; W_d)$, where z is the low-dimensional latent representation and $W_d$ represents the parameters of the decoder. Further, using training data $\{x_1, \ldots, x_N\}$, the auto-encoder can be trained by solving the following optimization problem.

$$\{W_e^{tr}, W_d^{tr}\} = \arg \min_{W_e, W_d} \sum_{i=1}^{N} \|x_i - D(E(x_i; W_e); W_d)\|_2^2.$$

The above problem may be approximately solved using a backpropagation algorithm. The trained encoder $E(x; W_e^{tr})$ may be used to compress the high-dimensional data. The trained decoder $D(z; W_d^{tr})$ may be used to decompress the latent representation.

The terms AI, ML, deep learning (DL), and DNNs may be used interchangeably. Some feature(s) described herein are exemplified based on learning in wireless communication systems. The methods are not limited to such scenarios, systems and services and may be applicable to any type of transmissions, communication systems, services, and/or the like.

The terms AE, AE model, AI/ML model, ML model, and AI model may be used interchangeably, and may refer to the model used for CSI compression.

Figure 4:
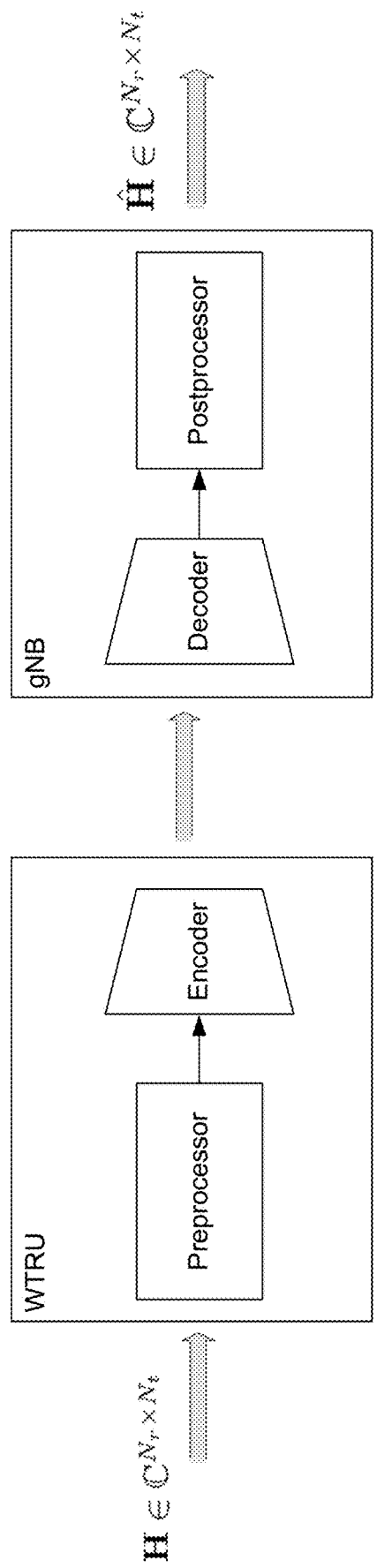
FIG. 4 illustrates an example artificial intelligence/machine learning (AI/ML) framework for CSI compression.

FIG. 4 illustrates an example AI/ML framework for CSI compression. The AI/ML framework for CSI compression using an AE may include a pre-processor and an AI/ML encoder at the WTRU and a post-processor and AI/ML decoder at the gNB, as illustrated in FIG. 4. The input channel $H \in \mathbb{C}\ N_r \times N_t$ may be preprocessed (e.g., transformed to another domain). The input channel may be $\mathbb{C}$ compressed by the AI/ML encoder. The compressed channel (e.g., received at the decoder) may be de-compressed by the AI/ML decoder and may be post-processed (e.g., to be transformed back to the original domain associated with the input channel H).

Feature(s) associated with beam domain preprocessing are provided herein.

Figure 5:
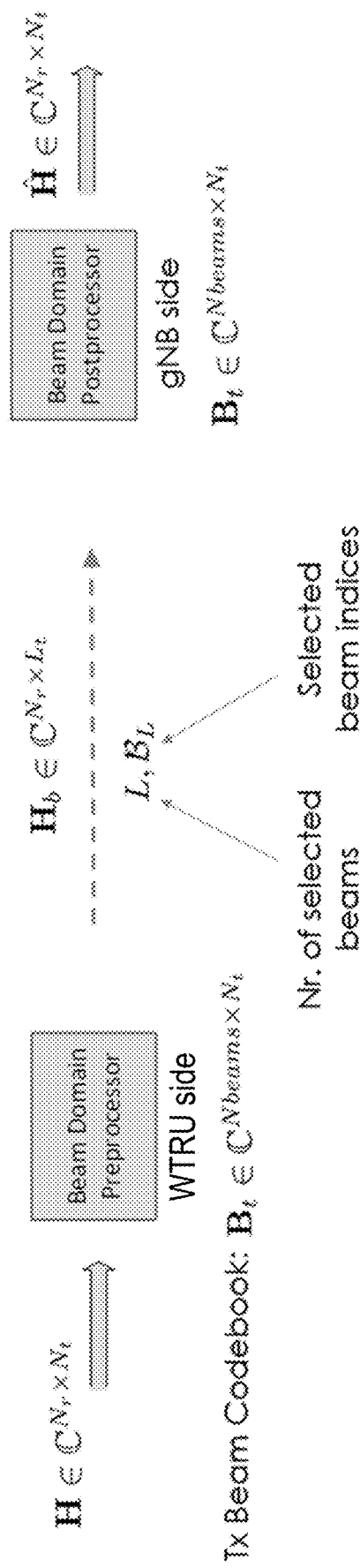
FIG. 5 illustrates an example beam domain preprocessor and post-processor.

Beam domain preprocessing may involve in a linear transformation of the channel response matrix from the antenna domain $H \in \mathbb{C}\ N_r \times N_t$ to the beam domain channel $H_b \in \mathbb{C}\ N_r \times L_t$, as illustrated in FIG. 5. The transformation using a beam domain preprocessor (BDP) may involve selecting a set of beams ($L_t$) from a transmit (Tx) codebook ($B_t \in \mathbb{C}\ N_{beams} \times N_t$) that is known at both communication sides (e.g., WTRU/encoder and gNB/decoder), where $L_t$ is smaller than the number of available beams ($N_{beams}$) in the codebook.

The size of the channel response matrix represented in the beam domain may be smaller than the original size of the channel response in the antenna domain (e.g., $L_t \ll N_t$, which may reduce the complexity of the AE used for CSI compression). The preprocessed channel response may be applied at the input of the AE (e.g., input of the AI/ML encoder) to be compressed and sent back to the receive (Rx) side for decompression and post-processing.

Machine learning-based approaches (e.g., AEs) may reduce the CSI feedback overhead while maintaining target performance. The AE structures/architectures may be complex in nature (e.g., many layers with a large number of nodes per layer). The complexity may increase for high dimensional inputs, which may impact the CSI processing latency and power consumption of WTRUs.

Large input dimensionality may increase the complexity of the AE and the model-related techniques (e.g., online training, dataset transfer/collection and fine-tuning). To support variable channel configurations (e.g., different numbers of antennas), the WTRUs may be equipped or configured with multiple AE models of different input sizes (e.g., which may limit the flexibility and/or increase the WTRU complexity). Existing techniques associated with AI/ML-based CSI may decouple the selection of the pre/postprocessing from the selection of the AI/ML encoder/decoder, which may result in sub-optimal performance.

Feature(s) described herein may be used to alleviate the AE complexity, enable seamless ML model techniques (e.g., dataset transfer/collection, fine tuning, online training, and/or the like) for model update, and provide flexible AE models that may be used regardless of the input dimensionality (e.g., number of Tx/Rx antennas).

Feature(s) provided herein may be associated with selecting a beam domain preprocessor (e.g., how to determine the best beam domain preprocessor parameters required to maintain a target performance).

Feature(s) provided herein may be associated with selecting the input domain of the BDP (e.g., eigenvector and/or full channel) to achieve a favorable performance-overhead tradeoff.

Feature(s) associated with selection of a BDP input type and determination of BDP parameters are provided herein.

A WTRU configured to use BDP for CSI feedback may be configured to determine a type of BDP input and BDP parameters. The configuration (e.g., received configuration information) may include a rank threshold, types of BDP input (e.g., full channel, eigenvectors, etc.), a BDP update reporting mode (e.g., incremental reporting or new reporting relative to the previous report), and/or the like.

The WTRU may receive CSI-RS(s). The WTRU may estimate CSI (e.g., the full CSI) and the channel rank.

Example channel conditions may include: channel rank (e.g., the rank of the estimated channel matrix, which indicates a number of independent spatial streams that may be supported by the communication link), angular spread of the estimated channel, number of clusters (e.g., in the spatial/angular domain) of the channel response, estimated angle of arrival (AoA), angle of departure (AoD), and/or the like.

The WTRU may select the type of BDP input as a function of determined channel condition(s), configured rank threshold, and/or configured performance metrics (e.g., the WTRU may select an eigenvector for the BDP input type if the measured rank is below the configured rank threshold, and may otherwise select full channel for the BDP input type).

The WTRU may determine the parameters for the selected type of BDP input based on one or more channel condition(s), feedback overhead, and/or configured performance metrics. The determined parameters may include the set of beams, polarization information, and the codebook (e.g., if full channel is selected for BDP input).

The WTRU may preprocess the CSI using the selected type of BDP input and/or the determined parameters for the selected type of BDP input. The WTRU may perform CSI compression using the configured AE model.

The WTRU may report the compressed CSI and the selected type of BDP input and/or determined parameters for the selected type of BDP input.

Figure 6:
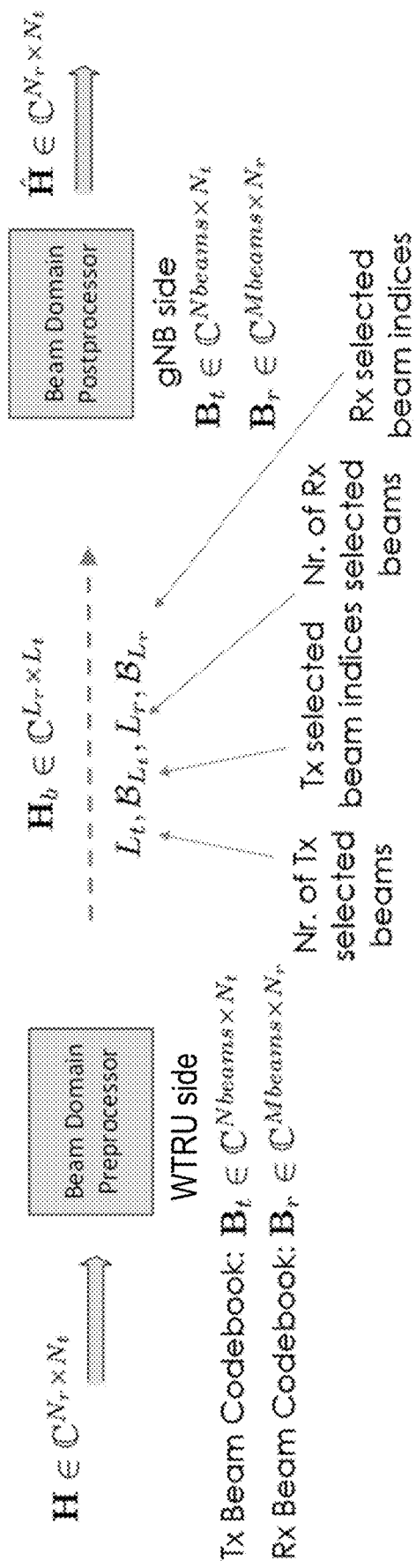
FIG. 6 illustrates an example of beam-domain preprocessing for transmit and/or receive side.

A transformation to the beam domain may use a transmit (Tx) only codebook, a receive (Rx) only codebook, or both a Tx and an Rx codebook, as illustrated in FIG. 6.

FIG. 6 illustrates an example of beam-domain preprocessing for Tx and/or Rx side.

The type of transformation to beam domain may be referred to as a "BDP type," where a BDP type may refer to any of the following: transmit beam domain preprocessing (e.g., Tx-only, for example, Tx codebook (only Tx codebook) is used and $L_t$ transmit beams are selected/determined and signaled); receive beam domain preprocessing (e.g., Rx-only, for example Rx codebook (only Rx codebook) is used and $L_r$ receive beams are selected/determined and signaled); transmit beam domain preprocessing and receive beam domain preprocessing (e.g., Tx-Rx, for example, Tx and Rx codebooks are used and $L_t$ transmit beams and $L_r$ receive beams are selected/determined and signaled); or none (e.g., no BDP is used, for example, skipping beam domain preprocessing), which may occur, for example, if the complete basis (e.g., $L_t=N_t$ and $L_r=N_r$) is used to maintain a target performance.

The term beam domain preprocessing (BDP) may be used interchangeably with preprocessing matrix, transform matrix, transforming input dimension, transforming input to virtual antennas, antenna virtualization, and physical-to-beam conversion.

The terms codebook and BDP codebook may be used interchangeably, and may refer to the codebook containing the set of configured transmit or receive beams that may be used to select beams for domain transformation.

BDP feature(s) described herein may enable support of variable input sizes (e.g., different number of antennas) by making the AE model usable regardless of the number of antennas. The BDP feature(s) described herein may reduce the AE input size (e.g., with negligible loss in information, and better AE performance). The BDP feature(s) described herein may reduce the dimensionality of the different AE layers (e.g., input, output, bottleneck), which in turn may reduce the complexity of the AI/ML encoder, may reduce the WTRU complexity (e.g., processing time, because a lightweight AE may be used as compared to the case with no BDP), and may facilitate AE-related procedures (e.g., dataset transfer and fine-tuning) that may help maintain the AE performance.

Feature(s) associated with configuring the beam domain preprocessor are provided herein.

A WTRU capable of AI/ML-based CSI feedback may be configured, indicated, or requested to enable beam domain processing (BDP) for CSI feedback reporting (e.g., via one or more of RRC, MAC CE, and/or DCI).

Configuring the WTRU to enable BDP may involve configuring one or more of the following: BDP type, an indicator for AI/ML model and BDP type selection, a BDP codebook, BDP parameters, a BDP performance threshold, BDP performance metrics, a BDP input type, and/or a rank threshold.

The BDP type may be configured. For example, the BDP type may describe the linear transformation of the channel response to beam domain using a BDP codebook. The BDP type may be Tx-only (e.g., transformation to beam domain uses a BDP Tx codebook only), Rx-only (e.g., transformation to beam domain uses a BDP Rx codebook only), Tx-Rx (e.g., transformation to beam domain uses both a BDP Tx codebook and a BDP Rx codebook), or none (e.g., no BDP is performed).

The WTRU may receive an indication of the BDP type to use. The WTRU may determine the parameters specific to the indicated BDP type.

The WTRU may be configured to select the BDP type. For example, the WTRU may select at least one of the BDP type or the AI/ML model as a function of a (e.g., configured) performance threshold and a channel condition (e.g., wherein the channel condition is associated with the BDP type and/or the AI/ML model).

The WTRU may be configured with an indicator for AI model and BDP type selection (e.g., an AIModel-BDP-Selection-Indicator). The indicator may indicate to the WTRU the BDP type and AE model combination to determine/select. For example, the WTRU may receive an indication for the WTRU to determine/select the BDP type for a configured AE model. The WTRU may receive an indication for the WTRU to jointly determine the BDP type and the AE model (e.g., as a function of a configured performance threshold and channel condition). The WTRU may receive an indication for the WTRU to determine/select the AE model for a configured BDP type. The WTRU may receive an indication for the WTRU to not select the AE model or BDP type.

The WTRU may be configured with a BDP codebook. The BDP codebook may indicate to the WTRU the Tx (BDP) codebook and/or the Rx (BDP) codebook that may be used for beam domain processing for the determined/selected BDP type. The BDP codebook may include (e.g., for each of the Tx and Rx codebooks): predefined codebooks (e.g., DFT codebooks), an oversampling factor for the DFT codebook, and/or a precoding matrix of the Type I or Type II codebook (e.g., W1, W2).

The WTRU may be configured with BDP parameters. The BDP parameters may indicate to the WTRU beam domain processing parameters. The BDP parameters may include one or more of the following: a number of Tx beams (e.g., a maximum number of Tx beams to use with the Tx (BDP) codebook); a number of Rx beams (e.g., a maximum number of Rx beams to use with the Rx (BDP) codebook); polarization information; and/or the like.

The WTRU may be configured with a BDP performance threshold. The BDP performance threshold may provide a threshold for the performance of the combined BDP and AE chain, to enable the WTRU to determine/select (e.g., jointly determine/select) the BDP type and AE model (e.g., determine the BDP type and AE model based at least partially on whether the threshold is satisfied). The BDP performance threshold may be a maximum normalized mean squared error (NMSE) value for the channel reconstruction quality of the combined BDP and AE chain.

The WTRU may be configured with BDP performance metric(s). The BDP performance metric may enable the WTRU to determine/select (e.g., jointly determine/select) the BDP type and AE model (e.g., determine the BDP type and AE model based at least partially on whether the threshold is satisfied). The BDP performance metric may provide performance metrics (e.g., NMSE or Squared Generalized Cosine Similarity (SGCS)) for the BDP and/or the AE. For example, the BDP performance metric may include one or more of the following: an NMSE or SGCS value for channel reconstruction of the BDP type (e.g., NMSE or SGCS of the standalone BDP preprocessing and post-processing pair); an NMSE or SGCS value for channel reconstruction quality of the AI/ML model (e.g., NMSE or SGCS of the standalone AE model, for example, where no preprocessing or post-processing is performed); NMSE or SGCS of the combined BDP and AI/ML model; and/or the WTRU may be provided with BDP performance metrics corresponding to each BDP type (e.g., Tx only, Rx only, both Tx and Rx, or none), where for each BDP type the performance metric may be indicated in one or more lookup tables (e.g., indexed by the number of beams in the BDP space).

The WTRU may be configured with a BDP input type. The BDP input type may indicate to the WTRU the type of CSI input to the beam domain preprocessing supported by the gNB. For example, the BDP input type may be full channel matrix, eigenvector (EV), or both. If the gNB supports both full channel and EV BDP input types, the WTRU may determine/select the BDP input type (e.g., as a function of one or more determined channel condition(s), a configured rank threshold, and/or a configured performance metric).

The WTRU may be configured with a rank threshold. If the WTRU is configured to determine/select the BDP input type (e.g., full channel or EV), the WTRU may use the rank threshold for the determination (e.g., the determination of the BDP input type may be based on the rank threshold). For example, the WTRU may determine/select EV for the BDP input type if the measured rank is lower than the configured rank threshold.

Feature(s) associated with indicating the selected BDP and AE parameters are provided herein.

One or more features provided herein are described in the context of preprocessing at the WTRU and post-processing at the gNB. A person of ordinary skill in the art will understand that WTRU-to-gNB transmissions are provided as examples, and that the features described herein are equally applicable to cases of WTRU-to-WTRU, gNB-to-WTRU transmissions, and (more generally) to transmissions between any WTRUs. One or more features provided herein are described in the context preprocessing of CSI feedback. A person of ordinary skill in the art will understand that preprocessing of CSI feedback is provided as an example and that the features described herein are equally applicable to preprocessing of any type of feedback, and (e.g., more generally) to any transmission.

Example BDP types are provided herein.

A WTRU may be configured with a BDP type. The BDP type may be associated with a specific aspect or configuration of BDP. The BDP type may be a type of transformation applied to the input. For example, the BDP may involve transforming a channel matrix from antenna domain to beam domain. For example, the BDP may involve multiplying the input with a transform matrix before AI/ML model processing. For example, the BDP type may include one or more of the following: Tx-only (e.g., the WTRU may be configured to apply BDP using a Tx beam codebook and/or determine/select and/or report the number of Tx beams, $L_t$); Rx-only (e.g., the WTRU may be configured to apply BDP using an Rx codebook and/or determine/select and/or report the number of Rx beams, $L_r$); Tx-Rx (e.g., the WTRU may be configured to apply BDP using both a Tx codebook and an Rx codebook and/or determine/select and/or report the number of Tx and/or Rx beams, Lt and Lr, respectively); none (e.g., the WTRU may not apply any BDP).

Example BDP parameters are provided herein.

A WTRU may apply BDP for CSI feedback. The WTRU may be configured to jointly determine the BDP type (e.g., Tx only, Rx only, both Tx and Rx, or none) and the AI/ML model as a function of one or more (e.g., based on at least one of) channel condition(s), configured performance threshold, and/or CSI overhead constraint. For example, if the WTRU is configured for BDP type Tx only or BDP type Tx and Rx, the WTRU may determine a number of transmit beams from a transmit codebook (e.g., select Lt beams from a Tx codebook, where $L_t$ is the number of WTRU-selected transmit beams and $L_t$ is less than or equal to the number of available transmit beams $N_T$ in the Tx codebook). The transmit codebook may be predefined and/or preconfigured.

If the WTRU is configured for BDP type Rx only or BDP type Tx and Rx, the WTRU may determine a number of receive beams from a receive codebook (e.g., select $L_r$ receive beams from an Rx codebook, where $L_r$ is the number of WTRU-selected receive beams and $L_r$ is less than or equal to the total number of available receive beams NR in the Rx codebook).

The WTRU may determine one or more BDP parameter(s). The term BDP parameters may include one or more of the following: a parameter related to a transformation matrix used for BDP, a parameter related to the beam codebook (e.g., DFT basis of a beam codebook, an oversampling factor, a maximum number of Tx, a maximum number of Rx beams, an index of selected Tx beam(s), an index of selected RX beam(s), etc.), a beam selection algorithm (e.g., orthogonal matching pursuit, max-oversampled, multi-orthogonal, greedy beam selection, combinatorial optimization, etc.), polarization information (e.g., whether the beam information is common or specific to polarization, the number of selected beams/beam indices per polarization, etc.), a type of input for beam domain preprocessing (e.g., eigenvector or channel matrix based on channel rank, criteria used for selection of input type, etc.), and/or the like.

The BDP may be a function of the type of input used for CSI feedback. For example, the WTRU may be configured to select the type of BDP input (e.g., full channel response or eigenvectors) and/or determine the BDP parameters as a function of one or more channel condition(s), configured rank threshold, and/or configured performance metrics. For example, if eigenvector is selected as the input type, then the WTRU may report different parts of CSI via different mechanisms. For example, the WTRU may report W1 based on legacy DFT codebook and report W2 based on AI/ML-based compression.

Feature(s) associated with reporting of BDP types and/or parameters are provided herein.

The WTRU may determine the type of BDP and/or BDP parameterization to be applied for CSI processing (e.g., CSI compression) based on preconfigured rules/criteria described herein. For example, the CSI may be preprocessed based on the BDP parameter(s). The WTRU may be configured to indicate to the network the selected BDP type and/or BDP parameterization. The WTRU may be configured to select BDP parameters based on the configured/selected BDP type. The WTRU may be configured to report BDP parameters as a function of the type of BDP configured and/or selected. For example, the WTRU may report different BDP parameters for different BDP types. The WTRU may be preconfigured with a range for BDP parameters within which the WTRU may perform the BDP parameter selection.

The WTRU may be configured to indicate one or more AI/ML parameter(s) (e.g., parameter(s) associated with the selected AI/ML model) associated with CSI feedback generation. The AI/ML parameter(s) may include one or more of: an AI/ML model identifier (ID), an input size of the AI/ML model, a bottle neck size of the AI/ML model, etc. The CSI may be compressed based on the AI/ML parameter(s). The WTRU may be configured to select (e.g., jointly select) BDP parameters and/or AI/ML model parameters based on preconfigured rules/criteria described herein. The WTRU may be configured to indicate, to the network, the selected BDP type and/or BDP parameterization and/or AI/ML model parameters. The WTRU may indicate (e.g., implicitly indicate) one or more AI/ML model parameters via the selection/indication of BDP parameters. The WTRU may indicate (e.g., implicitly indicate) one or more BDP parameters via selection/indication of AI/ML model parameters.

One or more BDP parameter groups may be preconfigured for the WTRU. The BDP parameter groups may be associated with a logical identity. The WTRU may report the logical identity associated with a beam parameter group in the BDP parameter indication.

The WTRU may be configured to report the BDP type and BDP parameters in a feedback message (e.g., a single feedback message). The WTRU may be configured to report the BDP type and BDP parameters in different feedback messages. This may be beneficial if the BDP type changes less frequently compared to BDP parameters, for example. The WTRU may report the selected BDP type in a MAC control element. For example, the WTRU may report the BDP parameters in a layer 1 (L1) feedback (e.g., on a PUCCH resource). For example, the WTRU may report BDP parameters in a PUSCH resource. The WTRU may indicate the BDP type based on selection of a preconfigured resource (e.g., a PUCCH resource) and transmit the BDP parameters using the selected resource.

The WTRU may be configured with a BDP reporting mode. The BDP reporting mode may include incremental/delta reporting, skip, and new report. The WTRU may be configured to transmit an incremental/delta BDP report. Content of the incremental/delta BDP report may include a subset (e.g., only a subset) of BDP parameters that changed from a previously transmitted BDP report. The WTRU may be configured to skip the BDP report if the BDP parameters are not changed from a previous BDP report.

The WTRU may be configured to report the BDP type and/or BDP parameters as a function of a CSI reporting configuration. The WTRU may be configured to report the BDP type and/or BDP parameters as a function of measured CSI and/or AI/ML model performance.

The term BDP report may refer to WTRU feedback containing a BDP type and/or BDP parameters and/or AI/ML model parameters. The WTRU may be configured to transmit a BDP report along with a CSI report. For example, the WTRU may transmit the BDP report explicitly with the CSI report. For example, the WTRU may transmit the BDP information in a first part of the CSI report and the compressed CSI feedback in a second part of the CSI report. The WTRU may transmit the BDP report implicitly via the CSI report. The WTRU may be preconfigured with multiple CSI reporting resources. Each CSI reporting resource may be associated with a preconfigured BDP parameter set. The WTRU may be configured to determine the CSI reporting resource as a function of the selected BDP parameter. The WTRU may implicitly indicate the BDP parameter using the transmission of the CSI report on the appropriate CSI reporting resource.

The WTRU may be configured to transmit the BDP report (e.g., independent from CSI reporting).

The WTRU may be configured to transmit a BDP report periodically. The WTRU may determine the periodicity of BDP reporting as a function of the periodicity of CSI reporting. The WTRU may be configured to transmit a BDP report when aperiodic CSI report is triggered. The WTRU may determine the resources for BDP report transmission as a function of resources for CSI reporting. The WTRU may receive a BDP configuration in the aperiodic CSI request. For example, the WTRU may be explicitly configured to apply the BDP based on a BDP configuration received in an aperiodic CSI request (e.g., possibly override the WTRU-based BDP parameter selection). The aperiodic CSI request may indicate for the WTRU to disable BDP for CSI feedback.

The WTRU may be configured to transmit a BDP report based on one or more preconfigured events (e.g., trigger events/conditions). For example, the trigger conditions may include one or more of the following: the performance of the AI/ML model changes (e.g., increases or decreases) by a preconfigured threshold; the AI/ML model is switched/changed/disabled; upon successful RRC reconfiguration with sync; successful beam failure recovery; and/or any trigger condition described herein that leads to a change in BDP parameter (e.g., selected beams and/or BDP type is different from previous report).

Feature(s) associated with BDP input type selection and BDP parameter determination are provided herein.

A device (e.g., a wireless transmit/receive unit (WTRU)) configured to use BDP for CSI feedback may be configured to determine a type of BDP input and BDP parameters. The configuration (e.g., received configuration information) may include: a rank threshold, types of BDP input (e.g., full channel, eigenvectors, etc.), a BDP update reporting mode (e.g., incremental reporting or new reporting relative to the previous report), and/or the like.

The device may receive CSI-RS(s). The WTRU may estimate CSI (e.g., the full CSI) and the channel rank. The device may select (e.g., determine) the type of BDP input based on (e.g., as a function of) one or more determined channel condition(s), configured rank threshold, and/or configured performance metrics (e.g., the device may select an eigenvector for the BDP input if the measured rank is below the configured rank threshold, and may otherwise select full channel for the BDP input).

The device may determine the parameter(s) for the selected type of BDP input based on one or more channel condition(s), feedback overhead, and/or configured performance metrics. The determined parameter(s) may include: the set of beams, polarization information, codebook (e.g., if full channel is selected for BDP input), and/or the like. The device may preprocess the CSI using the selected type of BDP input and/or the determined parameters for the selected type of BDP input. The device may perform CSI compression using the configured AE model. The device may report the compressed CSI and the selected type of BDP input and/or determined parameters for the selected type of BDP input.

The WTRU may determine BDP parameter(s).

One or more of BDP types may be used, determined, or defined. A BDP type may be identified based on one or more of following properties.

The BDP type may be identified based on whether a transform matrix is used at Tx or Rx for input/output of an AI/ML model. The transform matrix may be linearly multiplied to the input/output vector and/or matrix for the AI/ML model.

The BDP type may be identified based on a type of the transform matrix used. For example, a first transform matrix type may be based on a codebook which is known by both transmitter (e.g., WTRU) and receiver (e.g., gNB). A second transform matrix type may be based on eigenvector(s) derived, calculated, or determined by a transmitter or a receiver. A first transform matrix type may be based on a composite precoding matrix of one or more component codebook matrixes (e.g., $W_1$, $W_2$, $W_f$ of Type I or Type II codebook). A second transform matrix type may be based on a component codebook matrix. A first transform matrix type may be based on a first number of beams (e.g., number of columns or rows of the transform matrix). A second transform matrix type may be based on a second number of beams.

The BDP type may be identified based on a triggering mechanism (e.g., dynamic or semi-static, explicit or implicit). For example, for a first BDP type, a transform matrix may be dynamically triggered or indicated (e.g., via DCI, DCI triggering CSI feedback) and for a second BDP type, a transform matrix may be semi-statically triggered or indicated (e.g., via RRC configuration). For a first BDP type, a transform matrix may be explicitly triggered or indicated (e.g., via signaling to tell WTRU or gNB whether a transform matrix is used or not), and for a second BDP type, a transform matrix may be implicitly triggered or indicated (e.g., based on predefined conditions).

A WTRU may receive a set of BDP parameter(s) for a determined BDP type. The set may include different BDP parameter(s) based on BDP type. The set of BDP parameter(s) may include one or more of the following parameters.

The set of BDP parameter(s) may include one or more parameters related to one or more transform matrices including one or more of the following: codebook type (e.g., Type I, Type II) and associated codebook parameters (e.g., number of antennas, scaling factor, number of beams, oversampling factor, polarization information, etc., where the parameters may be associated with a component precoder (e.g., $W_1$)); a number of columns and/or number of rows for the transform matrix; and/or a subset of a codebook which may be used for a transform matrix. A component precoder of a codebook (e.g., $W_1$) may be used as a transform matrix.

The set of BDP parameter(s) may include one or more parameters related to beams (e.g., a maximum number of beams, a number of selected beams and associated beam indices, and/or vectors or matrices associated with the beams). The maximum number of beams may be larger than the selected beams used for BDP. For example, a subset of beams out of the maximum number of beams may be used for BDP. A set (e.g., a predefined set) of selected beams may be used for BDP. The identity of the beams in the set may be reported by the WTRU. A WTRU may select beams that may be common for horizontal and vertical polarizations when a cross-polarized antenna is used. A WTRU may select a first set of beams for a first polarization (e.g., V-pol) and a second set of beams for a second polarization (e.g., H-pol). The WTRU may report the number of beams selected and/or a list of beam identities.

The set of BDP parameter(s) may include one or more parameters related to reporting of BDP. For example, the set of BDP parameters may include a number of bits to be used for BDP reporting (e.g., an index associated with the determined transform matrix and/or selected beams), an uplink resource to use for BDP reporting, and/or a priority of BDP-related reporting when the BDP reporting collides with other reports or uplink signals.

A WTRU may determine that a set of BDP parameter(s) (or BDP type) may include one or more of following.

The set of BDP parameter(s) (or BDP type) may include an AI/ML (AE) model (e.g., AI/ML model identity) used for CSI reporting (e.g., CSI compression). A first set of BDP parameters may be determined when a first AI/ML model is used, activated, determined, or selected and a second set of BDP parameters may be determined when a second AI/ML model is used, activated, determined, or selected. A set of BDP parameters may be determined as a function of the AI/ML model identity.

The set of BDP parameter(s) (or BDP type) may include an AI/ML model performance (e.g., accuracy of the AI/ML model). For example, if performance of an AI/ML model is higher than a threshold, a first set of BDP parameters (or BDP type) may be used or determined. Otherwise, a second set of BDP parameters (or BDP type) may be used or determined.

The set of BDP parameter(s) (or BDP type) may include a determined or used BDP type.

The set of BDP parameter(s) (or BDP type) may include a number of available bits to use for CSI reporting (e.g., AI/ML-based CSI reporting). For example, if the number of available bits for a CSI reporting is larger than a threshold, a first set of BDP parameters (or BDP type) may be used or determined. Otherwise, a second set of BDP parameters (or BDP type) may be used or determined. The number of available bits may be determined based on at least one of: uplink channel type, number of resource elements, coding rate, modulation order, number of layers, and/or DM-RS overhead.

The set of BDP parameter(s) (or BDP type) may include a priority of the CSI to report, a reporting mode of operation for CSI reporting (e.g., compressed mode, non-compressed mode), a transmission mode of operation (e.g., SU-MIMO, MU-MIMO), and/or a target use case (e.g., enhanced mobile broadband (eMBB), massive machine-type communications (mMTC), ultra-reliable low latency communications (URLLC), etc.).

Feature(s) associated with beam selection techniques are provided herein.

Different approaches may be used to select beam(s) (e.g., specific beams) for beam domain preprocessing. Example techniques may leverage a codebook, C, that includes potential beam domain vectors. A WTRU may identify the set of beams to be selected for beam domain preprocessing based on different techniques.

Different versions of the codebook, C, may be used. An example codebook is the discrete Fourier transform (DFT) codebook. The entries of the DFT codebook may be the columns of the DFT matrix. The columns of the DFT matrix may be orthogonal. The set of beams may (e.g., also) be orthogonal to each other. The DFT codebook may be oversampled to achieve a larger set of beams. Although the oversampling operation may remove the orthogonality, the oversampling may yield a larger set of beams with a smaller angular granularity (e.g., thereby producing more options for beam selection). The oversampling factor may be any integer value. Another (e.g., any other) codebook (e.g., other than the DFT codebook) that matches the Tx/Rx antenna configuration may be utilized for the beam domain preprocessing. Array response vectors may be used to form a codebook for a range of potential Tx/Rx angles. Codebooks learned from data using different ML methods (e.g., such as data clustering) may be used to provide a codebook (e.g., a codebook of higher efficiency).

The beam domain preprocessing module may use the following inputs. For example, the inputs may include an input channel matrix H (e.g., full channel matrix). The dimensionality of H may be, $K \times N_r \times N_t$, where K is the number of configured sub-bands in the channel and $N_r$ and $N_t$ are the number of receive and transmit antennas, respectively. In the wideband setting, the channel may be averaged across the K sub-bands. In the narrowband operation, the sub-band dimension may remain as is.

The inputs to the beam domain preprocessing module may include the codebook matrix, including a set of potential beam vectors. The inputs to the beam domain preprocessing module may include the number of beams to be selected, L.

The preprocessing may reduce the complexity of the channel data and compress the channel data into as few elements as possible. To efficiently (e.g., most efficiently) compress the channel, the WTRU may use the basis formed by the beams that may de-correlate the channel and make the covariance matrix concentrated around the diagonal entries.

The beam domain preprocessing may be performed in a wideband setting. A set (e.g., a single set) of beams may be selected and used to process the channel across sub-carriers (e.g., all sub-carriers). The beams may be selected in a narrowband setting. Another (e.g., different) set of beams may be selected for each sub-band (e.g., the sub-band size for the preprocessing may be altered based on performance and complexity requirements). The narrowband setup may provide better performance from a preprocessing perspective (e.g., compared to wideband), but may have higher overhead (e.g., because the beams for each sub-band may be communicated from the WTRU to gNB separately for each sub-band). The narrowband setup may improve the stand-alone performance of the beam domain preprocessing, but may have an adverse impact on the deep learning-based compression performance. This is attributed to the fact that the use of different beams, with a different ordering, for each sub-band will remove the correlation in the channel across sub-carriers and may reduce the overall compression performance.

Feature(s) associated with (e.g., techniques and/or algorithms for) selecting the beams for beam domain preprocessing are provided herein. One or more feature(s) described herein may be described with respect to the wideband case. In the narrowband setup, the feature(s) may be utilized multiple times (e.g., independently for each sub-band).

To select the candidate beams, the WTRU may select the beams that results in the maximum energy upon projecting on the given wideband channel matrix (e.g., sometimes referred to as a maximum oversampled algorithm (MaxOversampled)). The maximum oversampled algorithm may involve performing one or more of the following.

Given a wideband channel matrix H, of dimensions $N_r \times N_t$, the maximum oversampled algorithm may involve estimating the channel correlation/covariance (Cov) matrix V=HH*, where '*' denotes the conjugate transpose operation. The matrix V is a $N_r \times N_r$ matrix, which may allow for the selection of the receive side beams.

The maximum oversampled algorithm may involve performing a 2D projection of the Cov matrix on the codebook matrix. The 2D projection may be described as: Proj=CVC* The larger the magnitude of the diagonal entries of the projection matrix Proj, the more suitable the respective beam may be for beam domain preprocessing. By using the projection matrix Proj, the beams corresponding to largest $N_b$ diagonal entries may be used for the preprocessing.

The maximum oversampled algorithm may involve repeating the previously described steps (e.g., with some changes to the covariance matrix V[k]) in order to evaluate the transmit side beams. For selecting the Tx beams, the covariance may be evaluated as V[k]=H[k]*H[k], which may be an $N_t \times N_t$ matrix and may allow for the selection of the Tx beams.

The WTRU may construct one or more (e.g., multiple) orthogonal codebooks and find the codebook with the beams that increase (e.g., maximize) the resulting value from projecting those beams on the estimated channel (e.g., sometimes referred to as Multiorthogonal or multi-orthogonal). The multi-orthogonal technique for beam domain processing may be used when the input codebook is an oversampled codebook that can be sub-divided into smaller orthogonal codebooks.

For example, in the case of an oversampled DFT codebook of size $(O_r N_r) \times N_r$, where $O_r$ represents the oversampling factor, the oversampled codebook may be (e.g., may need to be) sub-divided into $O_r$ smaller orthogonal codebooks of dimensions $N_r \times N_r$. In the case of a DFT codebook this may always be true, so the larger (e.g., original) codebook can be divided into $O_r$ orthogonal codebooks. With the option of $O_r$ possible orthogonal codebooks, the beam selection may be performed for each of the $O_r$ codebooks. The beams from the $O_r$ codebook that provides the best compression may be selected for preprocessing. For each of the $O_r$ potential codebooks, one or more of the following actions may be performed. Given the channel matrix H, the channel correlation/covariance matrix may be evaluated as V=HH'. The matrix V may be an $N_r \times N_r$ matrix and may allow for the selection of the receive side beams. A 2D projection of the covariance matrix may be performed on the codebook matrix. The 2D projection may be described as: Proj=CVC*. The $N_b$ indices of the diagonal entries with the largest magnitude may be the most suitable for the preprocessing and the corresponding beams may be selected.

If the L beams for each of the $O_r$ codebooks have been selected, the set of beams/codebook that provides the best compression performance may be evaluated. The compression performance may be evaluated by projecting the H[k] on the Lselected beams. The Lselected beams may be reprojected back using the same beams, $NMSE_r$=H[k]−$C_r$[Lselected,:]*$C_r$[Lselected,:]H[k], where Lselected denotes the Lselected beam indices. The orthogonal codebook $O_r$ with the least NMSE may be selected for the preprocessing.

The WTRU may select the beams in a manner that is sometimes referred to as "greedy beam selection." Given the channel matrix H, greedy beam selection may involve estimating the channel correlation/covariance matrix V=HH*. The matrix V may be a $N_r \times N_r$ matrix and may allow for the selection of the receive side beams.

Greedy beam selection may involve performing a 2D projection of the V matrix on the codebook matrix. The 2D projection may be described as:

$$Proj = CVC^*.$$

Greedy beam selection may involve selecting a beam corresponding to the largest diagonal entry. Greedy beam selection may involve removing the projection of the channel on the selected beam $H_{remaining}$=H−$C_r$[Lselected,:]*$C_r$[Lselected,:]H, where Lselected denotes the Lselected beam indices.

Greedy beam selection may involve repeating these actions to find the next best beam. The actions may continue to be repeated until $N_b$ beams are selected.

Feature(s) associated with combinatorial optimization are provided herein.

The beam selection task may be posed as a combinatorial problem. The beam selection task may be solved using mixed integer linear programming (MILP) styled formulations. Given the channel matrix H, and the $N_r \times N_r$ correlation/covariance matrix V=HH', the projected covariance matrix may be evaluated as: Proj=CVC*, where Proj may have a dimensionality of $(O_r N_r) \times (O_r N_r)$.

The beam selection task may be formulated as:

$$\max \frac{N_r - 1}{2} \sum_{i=1}^{O_r N_r} Proj_{ii} X_i - \sum_{i=1}^{O_r N_r - 1} \sum_{j=i+1}^{O_r N_r} Proj_{ij} X_i X_j$$

s.t $$\sum_{i=1}^{O_r N_r} X_i = N_b,$$

$$\forall\, X_i \in \{0, 1\}$$

The objective of the beam selection task may be to select the $N_b$ beams that have large diagonal elements and low interactions or overlap (e.g., as represented by the off-diagonal elements).

Trade-offs may exist between different beam selection techniques.

The number of beams to be used for preprocessing may affect the trade-offs. The number of beams may be a parameter to the beam domain preprocessing module. The quality of beams achieved from each of the beam selection techniques may be different. A combinatorial optimization framework (or an exhaustive search of all possible combinations of beams) may yield better beams (e.g., that may compress the channel with a fewer number of beams) when compared to techniques such as the maximum oversampled algorithm. From a computation perspective, the maximum oversampled algorithm may use fewer computations when compared to the combinatorial optimization or exhaustive search (e.g., which may have a considerably larger overhead). The WTRU or gNB may select a technique based on these considerations.

Instead of using a fixed number of beams as a parameter for the BDP techniques, the beam selection may be performed until a defined threshold on the reconstruction error is reached. In this case, beams may be recursively selected until:

$$H[k] - C_r[Lselected]^* \, C_r[Lselected] H[k] < Err_{threshold}$$

For different data points, different beam selection techniques may provide better performance. The data point may be considered when determining a BDP technique.

The WTRU may determine or select a BDP input type (e.g., EV and/or full channel beam domain). For example, the WTRU may determine the BDP input type based on at least one of: a rank threshold, a performance metric, or a channel condition.

Figure 7:
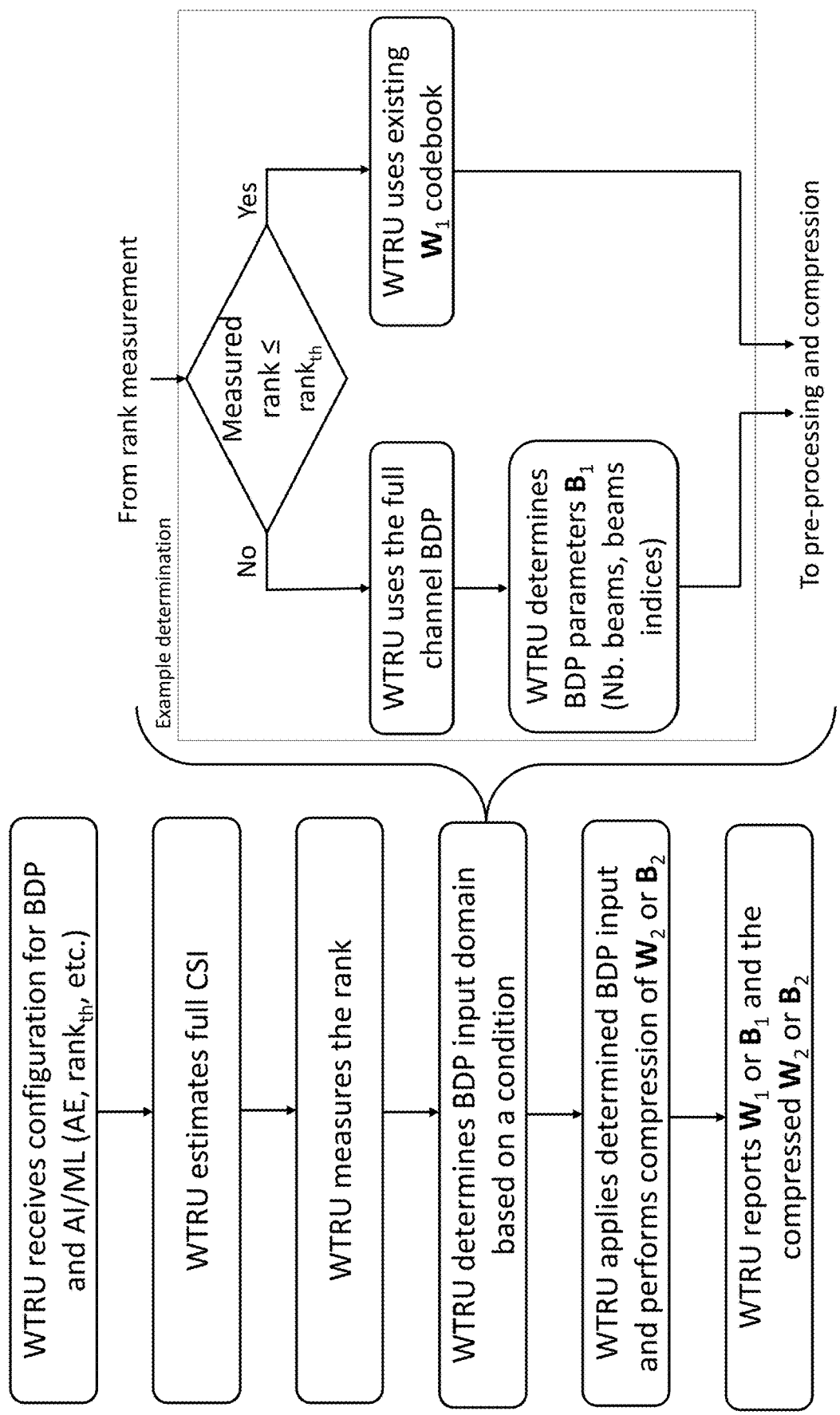
FIG. 7 illustrates an example of beam domain input selection (e.g., eigenvector and/or full-channel).

The WTRU may receive (e.g., from a network entity, for example, a base station) an input type selection indication that indicates for the device to determine the beam domain preprocessing input type. For example, the WTRU may receive (e.g., be configured with) a BDP-Input-Selection-Indicator parameter to enable the selection of the BDP input domain at the WTRU. For example, if the BDP-Input-Selection-Indicator parameter is set to 1, the WTRU may select/determine and report the input type for beam domain preprocessing. Otherwise, the WTRU may assume a configured default BDP input type. FIG. 7 illustrates an example technique for selecting a beam domain input type (e.g., EV and/or full channel beam domain) and associated parameters.

The BDP input types may include EV, full-channel, or both. The WTRU may determine/select and/or report the selected BDP input type based on a preconfigured threshold/ condition. The condition may include one or more of the following: a rank threshold; a BDP performance threshold (e.g., $NMSE_1$ or $SGCS_1$ as described herein); and/or PDSCH performance (e.g., BLER threshold). For example, the WTRU may recommend a different BDP input type based on the observed BLER.

For example, if the WTRU is configured with a rank threshold, then the WTRU may determine a measured rank based on a channel condition associated with the BDP input type (e.g., compute the rank of the wideband estimated channel matrix $H \in \mathbb{C}\ N_r \times N_t$, for example, using singular value decomposition (SVD)). The device may compare the measured rank with the configured rank threshold. If the measured rank is less than or equal to the configured rank threshold, the WTRU may select the EV-based BDP input domain (e.g., select EV as the BDP input type). For the low rank channels, the EV input domain may be more beneficial relative to the full channel from a complexity and performance perspective. If the measured channel rank is greater than the configured rank threshold, the WTRU may select and report the full channel matrix BDP input domain (e.g., select full-channel as the BDP input type). For the high rank channels, the full-channel input domain may have lower complexity and better performance relative to the EV domain.

The WTRU may determine the BDP input type based on a performance metric (e.g., performance metric threshold, for example, NMSE, SGCS, PDSCH performance, etc.) and a channel condition. For example, the WTRU may determine a performance of a first BDP input type (e.g., EV) based on the performance metric and a channel condition associated with the first BDP input type. The WTRU may determine a performance of a second BDP input type (e.g., full channel matrix) based on the performance metric and a channel condition associated with the second BDP input type. For example, the WTRU may compute the NMSE or SGCS performance associated with the configured BDP input types/domains (e.g., EV and full channel). The WTRU may compare the performance of the first BDP input type with the performance of the second BDP input type and select the BDP input type based on the comparison. For example, the WTRU may select the input domain that results in better performance (e.g., lower NMSE or SGCS).

The WTRU may perform actions based on EV being selected as the input for BDP.

The WTRU may be configured to use the EV for BDP input domain, or the WTRU may select the EV as the BDP input domain. If the EV domain is selected/preconfigured as the BDP input, the WTRU may select the Tx or/and Rx beams based on the Type I codebook or Type II codebook structure (e.g., sometimes referred to as the $W_1$ matrix) and the associated parameters. The $W_1$ matrix may include the selected Tx or/and Rx beams information. The associated parameters may include the polarization/co-phasing information. The WTRU may preprocess channel state information (CSI) based on the beam domain preprocessing input type (e.g., to generate beam domain CSI). For example, the WTRU may derive the preprocessed matrix (e.g., sometimes referred to as $W_2$) as:

$$W_2[k] = H[k]W_1$$

where k denotes the sub-band index, for k=1, . . . , K, and K is the number of configured sub-bands. The WTRU may compress (e.g., and report) the preprocessed CSI (e.g., the resulting $W_2[k]$ matrix, $\forall k$), for example, using the configured AE model (e.g., for all configured sub-bands). The WTRU may send (e.g., to a network entity, for example, a base station) the compressed preprocessed CSI (e.g., the compressed beam domain CSI). For example, the WTRU may report the $W_1$ and compressed $W_2$ information to the gNB.

The WTRU may perform actions based on full channel being selected as the input for BDP.

The WTRU may be configured to use the full channel for BDP input domain, or the WTRU may select the full channel as the BDP input domain. If the full channel is selected/preconfigured as the BDP input, the WTRU may determine the BDP parameters associated with the full channel beam domain preprocessing. The BDP parameters may include polarization information (e.g., single or double), and/or Tx and/or Rx codebook type and associated parameters (e.g., oversampling factor). Other BDP parameters may include the $B_1$ matrix (e.g., including the selected beams information associated with the configured BDP type) and the compressed $B_2$ matrix (e.g., compressed using the configured AE model). The WTRU may preprocess the CSI based on the BDP input type (e.g., to generate beam domain CSI, for example, the $B_2$ matrix). The $B_2$ matrix may be the resulting/ transformed matrix in the beam domain. The WTRU may compress the preprocessed (e.g., beam domain) CSI. For example, the $B_2$ matrix may include the input information to the AE model. The $B_1$ matrix may be derived based on any of the techniques described herein (e.g., greedy selection or multi-orthogonal). The WTRU may send the compressed preprocessed CSI (e.g., to a network entity, for example, a based station). The WTRU report the $B_1$ matrix and the derived compressed CSI (e.g., compressed $B_2$) in the beam domain.

The WTRU may be configured with: an indication for the WTRU to select a beam domain input type; with a rank threshold (e.g., for reusing W1 codebook); and/or a beam update flag (e.g., that incrementally indicates new beams, if any, over beams from the past time slot).

The WTRU may select EV and/or full channel beam domain preprocessing based on a configured rank threshold. For example, if a measured rank is less than the threshold, the WTRU may use EV-based beam domain preprocessing. If the measured rank is greater than the threshold, the WTRU may use full channel-based beam domain preprocessing.

If EV-based beam domain preprocessing is selected, the WTRU may reuse the $W_1$ codebook for beam domain reporting and compress the $W_2$ (e.g., transformed matrix) using the configured AE model (e.g., $W_1$ may be used as it is and the AE may compress $W_2$).

If full channel is selected as the BDP input type, then the WTRU may determine/select a set of beams ($B_1$) based on the full channel beam domain preprocessing, and the transformed channel $B_2 = B_1 * H$ may be compressed and sent to the gNB.

The WTRU may determine the remaining BDP parameters for beam domain preprocessing (e.g., polarization information, Tx/Rx codebook type (DFT, etc.), oversampling, etc.) based on channel-related measurements (e.g., AoA, AoD, rank, number of (dominant) paths, etc.).

The WTRU may determine whether polarization beam selection is beam-common or beam-specific based on the number of overlapping beams, overhead, performance, etc.

The WTRU may select the BDP input domain (EV and/or full channel) based on a preconfigured performance metric (e.g., NMSE or SGCS), rank threshold, or a combination of the configured rank threshold and performance metric (e.g., if the WTRU determines the BDP input domain and the associated parameters).

The WTRU may send an indication (e.g., to a network entity, for example, a base station) an indication of the determined/selected BDP input type. For example, the WTRU may report whether EV and/or full channel beam domain is used as an input to the AI/ML model.

If EV is used, the WTRU may report the selected $W_1$ (e.g., with its current uncompressed definition and structure) and the compressed $W_2$ (e.g., only $W_2$ is compressed using the AE model).

If full-channel is used, WTRU may report the selected beams and associated information (e.g., single or double polarization, number of beams, beam indices, etc.) with the transformed, reduced, and compressed information.

Since some beams (e.g., only a few beams) may be different across polarizations (e.g., two polarizations), only the additional beams (e.g., the beams in the second polarization that are different from the beams in the first polarization) may be reported based on the configured beam update flag.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A device comprising:
a processor configured to:
  determine a beam domain preprocessing input type based on at least one of: a rank threshold, a performance metric, or a channel condition;
  preprocess channel state information (CSI) based on the beam domain preprocessing input type to generate beam domain CSI;
  compress the beam domain CSI; and
  send the compressed beam domain CSI and an indication of the determined beam domain preprocessing input type.

2. The device of claim 1, wherein the processor being configured to determine the beam domain preprocessing input type based on at least one of: the rank threshold, the performance metric, or the channel condition comprises the processor being configured to determine the beam domain preprocessing input type based on the rank threshold and the channel condition, and the processor being configured to determine the beam domain preprocessing input type based on the rank threshold and the channel condition comprises the processor being configured to:
  determine a measured rank based on the channel condition;
  on a condition that the measured rank is less than or equal to the rank threshold, select eigenvector as the beam domain preprocessing input type; and
  on a condition that the measured rank is greater than the rank threshold, select full channel matrix as the beam domain preprocessing input type.

3. The device of claim 1, wherein the processor being configured to determine the beam domain preprocessing input type based on at least one of: the rank threshold, the performance metric, or the channel condition comprises the processor being configured to determine the beam domain preprocessing input type based on the performance metric and the channel condition, and the processor being configured to determine the beam domain preprocessing input type based on the performance metric and the channel condition comprises the processor being configured to:
  determine a performance of a first beam domain preprocessing input type based on the performance metric and the channel condition;
  determine a performance of a second beam domain preprocessing input type based on the performance metric and the channel condition;
  compare the performance of the first beam domain preprocessing input type to the performance of the second beam domain preprocessing input type; and
  select the beam domain preprocessing input type based on the comparison.

4. The device of claim 1 or 3, wherein the performance metric comprises a normalized mean squared error or a squared generalized cosine similarity.

5. The device of claim 1, wherein the processor is further configured to determine a beam domain preprocessing parameter associated with the determined beam domain preprocessing input type, and preprocessing the CSI is further based on the beam domain preprocessing parameter.

6. The device of claim 5, wherein the beam domain preprocessing parameter comprises one or more of:
  a parameter related to a transformation matrix used for beam domain preprocessing;
  a discrete Fourier transform basis of a beam codebook;
  an oversampling factor of the beam codebook;
  a maximum number of transmit beams;
  a maximum number of receive beams,
  an index of a selected transmit beam;
  an index of a selected receive beam;
  polarization information; or
  an input type for beam domain preprocessing.

7. The device of claim 1, wherein the processor is further configured to receive, from a network entity, an input type selection indication that indicates for the device to determine the beam domain preprocessing input type.

8. The device of claim 1, wherein the beam domain preprocessing input type comprises full channel matrix or eigenvector.

9. A method to be performed by a device, the method comprising:
  determining a beam domain preprocessing input type based on at least one of: a rank threshold, a performance metric, or a channel condition;
  preprocessing channel state information (CSI) based on the beam domain preprocessing input type to generate beam domain CSI;
  compressing the beam domain CSI; and
  sending the compressed beam domain CSI and an indication of the determined beam domain preprocessing input type.

10. The method of claim 9, wherein determining the beam domain preprocessing input type based on at least one of: the rank threshold, the performance metric, or the channel condition comprises determining the beam domain preprocessing input type based on the rank threshold and the channel condition, and determining the beam domain preprocessing input type based on the rank threshold and the channel condition comprises:
  determining a measured rank based on the channel condition;
  on a condition that the measured rank is less than or equal to the rank threshold, selecting eigenvector as the beam domain preprocessing input type; and
  on a condition that the measured rank is greater than the rank threshold, selecting full channel matrix as the beam domain preprocessing input type.

11. The method of claim 9, wherein determining the beam domain preprocessing input type based on at least one of: the rank threshold, the performance metric, or the channel condition comprises determining the beam domain preprocessing input type based on the performance metric and the channel condition, and determining the beam domain preprocessing input type based on the performance metric and the channel condition comprises:
  determining a performance of a first beam domain preprocessing input type based on the performance metric and the channel condition;
  determining a performance of a second beam domain preprocessing input type based on the performance metric and the channel condition;
  comparing the performance of the first beam domain preprocessing input type to the performance of the second beam domain preprocessing input type; and
  selecting the beam domain preprocessing input type based on the comparison.

12. The method of claim 9 or 11, wherein the performance metric comprises a normalized mean squared error or a squared generalized cosine similarity.

13. The method of claim 9, wherein the method further comprises determining a beam domain preprocessing parameter associated with the determined beam domain preprocessing input type, and preprocessing the CSI is further based on the beam domain preprocessing parameter.

14. The method of claim 13, wherein the beam domain preprocessing parameter comprises one or more of:
- a parameter related to a transformation matrix used for beam domain preprocessing;
- a discrete Fourier transform basis of a beam codebook;
- an oversampling factor of the beam codebook;
- a maximum number of transmit beams;
- a maximum number of receive beams,
- an index of a selected transmit beam;
- an index of a selected receive beam;
- polarization information; or
- an input type for beam domain preprocessing.

15. The method of claim 9, wherein the method further comprises receiving, from a network entity, an input type selection indication that indicates for the device to determine the beam domain preprocessing input type.

16. The method of claim 9, wherein the beam domain preprocessing input type comprises full channel matrix or eigenvector.

* * * * *